(12) United States Patent
Wang et al.

(10) Patent No.: US 7,831,674 B2
(45) Date of Patent: Nov. 9, 2010

(54) METHOD, APPARATUS AND SYSTEM FOR SAVING INSTANT MESSAGE

(75) Inventors: Jue Wang, Shenzhen (CN); Lunjian Mu, Shenzhen (CN)

(73) Assignee: Huawei Technolgoies Co., Ltd., Shenzhen (CN)

(*) Notice: Subject to any disclaimer, the term of this patent is extended or adjusted under 35 U.S.C. 154(b) by 238 days.

(21) Appl. No.: 12/004,047

(22) Filed: Dec. 20, 2007

(65) Prior Publication Data

US 2008/0126485 A1 May 29, 2008

Related U.S. Application Data

(63) Continuation of application No. PCT/CN2006/001421, filed on Jun. 22, 2006.

(30) Foreign Application Priority Data

Jun. 30, 2005 (CN) .................. 2005 1 0080583

(51) Int. Cl.
*G06F 15/16* (2006.01)
(52) U.S. Cl. .................. 709/206; 709/204; 709/205; 709/207; 379/88.22; 379/211.02
(58) Field of Classification Search ......... 709/204–207; 379/88.22–211.02
See application file for complete search history.

(56) References Cited

U.S. PATENT DOCUMENTS

| | | | |
|---|---|---|---|
| 6,920,478 B2 | 7/2005 | Mendiola et al. | |
| 7,584,258 B2* | 9/2009 | Maresh | 709/206 |
| 7,596,599 B1* | 9/2009 | Maghsoodnia et al. | 709/206 |
| 2002/0143916 A1 | 10/2002 | Mendiola et al. | |
| 2003/0120732 A1* | 6/2003 | Couts et al. | 709/206 |
| 2004/0158610 A1* | 8/2004 | Davis et al. | 709/206 |
| 2004/0214588 A1 | 10/2004 | Tanimoto | |
| 2005/0060167 A1* | 3/2005 | Patron et al. | 705/1 |
| 2005/0097440 A1* | 5/2005 | Lusk et al. | 715/500.1 |
| 2006/0025164 A1* | 2/2006 | Wang et al. | 455/466 |
| 2006/0031322 A1* | 2/2006 | Kessen et al. | 709/206 |
| 2006/0168048 A1* | 7/2006 | Lyle et al. | 709/206 |
| 2006/0227943 A1* | 10/2006 | Yan | 379/67.1 |
| 2006/0259468 A1* | 11/2006 | Brooks et al. | 707/3 |

FOREIGN PATENT DOCUMENTS

CN 1279864 A 1/2001

(Continued)

OTHER PUBLICATIONS

International Search Report from the Chinese Patent Office for International Application No. PCT/CN2006/001421.

(Continued)

*Primary Examiner*—Wing F Chan
*Assistant Examiner*—Razu A Miah
(74) *Attorney, Agent, or Firm*—Finnegan, Henderson, Farabow, Garrett and Dunner LLP

(57) ABSTRACT

A method for saving instant messages includes: determining a session saving policy; sending the session saving policy to a server; and saving, by the server, instant messages in a session in accordance with the session saving policy. A client, server and system are also provided.

23 Claims, 3 Drawing Sheets

FOREIGN PATENT DOCUMENTS

| | | |
|---|---|---|
| CN | 1319957 A | 10/2001 |
| CN | 1460215 A | 12/2003 |
| CN | 1482819 A | 3/2004 |
| CN | 1540945 A | 10/2004 |
| CN | 1561127 A | 1/2005 |
| WO | WO-03/094012 A1 | 11/2003 |

OTHER PUBLICATIONS

English Translation of Written Opinion of the International Searching Authority for PCT Application No. PCT/CN2006/001421, mailed Oct. 26, 2006, 3 pgs.

Office Action from the Chinese Patent Office for Application No. 200510080583.4, dated Oct. 19, 2007, 7 pgs, English translation attached.

\* cited by examiner

# METHOD, APPARATUS AND SYSTEM FOR SAVING INSTANT MESSAGE

CROSS-REFERENCES TO RELATED APPLICATIONS

This application is a continuation application of international Application No. PCT/CN2006/001421, filed on Jun. 22, 2006, which claims the priority of Chinese patent application No. 200510080583.4, contents of which will be incorporated by reference herein for all purposes.

FIELD OF THE INVENTION

The present invention relates to the technical field of instant message in a mobile communication network, and in particular to a method, apparatus and system for saving instant messages.

BACKGROUND OF THE INVENTION

The Instant Message (IM) service in the mobile communication network may be provided so that users can implement a one-to-one instant message session or an instant message session among multiple users by sending instant messages to each other. In some cases, an instant message system is required to save session content on a user's request, and to enable the user to view the session content or forward the session content to others, i.e. provide the functions of saving, reading, deleting and forwarding the content of the instant message session. The function of saving the session content is a basic function. Other functions can be provided on the basis of the function of saving the session content.

In the prior art, it can be implemented that a server determines whether to save instant messages in a current instant message session on a client's request, however, no solution is specified for the server to save instant messages in the session. Usually, the server has to save all the instant messages in the current instant message session with default.

Therefore, in the function of saving instant messages in the instant message service according to the prior art, the user can not freely select the saving range of the session content as required. Usually, the desired session content is not all the content of the current instant message session, but some specific content of the current session, i.e. some specific instant messages. If all content of the instant message session is saved by the server with default, many of the saved instant messages are not at the user's desire. Accordingly, the storage load in the server is increased, and the processing load of subsequent reading, deleting and sending the session content is also increased.

SUMMARY OF THE INVENTION

In view of the above, the present invention is to provide a method for saving instant messages, a relevant apparatus and a system, to achieve an object of saving instant messages in accordance with different saving policies.

The technical solution of the present invention is implemented as follows:

A method for saving instant messages, in which a session saving policy is determined, includes the following processes of:

sending the determined session saving policy from a client to a server; and saving, by the server, instant messages in a session in accordance with the session saving policy.

The determined session saving policy includes: saving instant messages within a recent time period, or saving at least one recent instant message, or saving instant messages within one time period or within several time periods, or saving instant messages between one and a specific contact.

The recent time period includes:

a time period up to a current time instant, or a time period starting from a current time instant;

the at least one recent instant message includes:

at least one instant message up to a current instant message, or at least one instant message starting from a current instant message.

the process of determining a session saving policy further includes:

indicating the session saving policy by an index number;

the process of sending the required session saving policy from a client to a server includes:

sending the index number of the required session saving policy from a client to a server; and the process of saving, by the server, instant messages in a session in accordance with the session saving policy includes:

determining, by the server, the session saving policy in accordance with the index number and saving the instant messages in the session in accordance with the determined session saving policy.

The process of sending the required session saving policy from a client to a server includes:

sending the required session saving policy from a client to a server if instant messages are required to be saved during an instant message session.

A default session saving policy is set in the client, and the process of sending the required session saving policy from a client to a server includes:

sending the default session saving policy in the client to a server when the client begins an instant message session.

The process of saving, by the server, instant messages in a session in accordance with the session saving policy includes:

saving, by the server, instant messages of all sessions corresponding to the client which sends the session saving policy, in accordance with the session saving policy.

During the process of sending the required session saving policy from a client to a server, the method further includes:

sending the session identifier of a session to be saved from a client to a server; and the saving, by the server, instant messages in a session in accordance with the session saving policy includes:

determining a corresponding session in accordance with the session identifier sent from the client and saving instant messages in the determined session in accordance with the session saving policy, by the server.

During the process of saving, by the server, instant messages in a session in accordance with the session saving policy, the method further includes:

saving the identifier of the session where the instant messages are.

During the process of saving, by the server, instant messages in a session in accordance with the session saving policy, the method further includes:

saving, by the server, at least one of the following information corresponding to each of the saved instant messages when saving the instant messages:

the sender of the instant messages, the receiver of the instant messages, the sending time of the instant messages, and the receiving time of the instant messages.

During the process of sending the required session saving policy from a client to a server, the method further includes:

sending the display name of a session to be saved from a client to a server; and during the process of saving, by the server, instant messages in a session in accordance with the session saving policy, the method further includes:

saving, by the server, the display name of the session where the instant messages are when saving the instant messages.

After the process of saving, by the server, instant messages in a session in accordance with the session saving policy, the method further includes:

sending a display name change instruction carrying a new display name and a session identifier corresponding to a display name to be changed from the client to the server; and determining, by the server, a corresponding session in accordance with the session identifier, and saving the new display name when saving the instant messages in the determined session.

After the process of saving, by the server, instant messages in a session in accordance with the session saving policy, the method further includes:

sending a cease saving instant message instruction from the client to the server; and ceasing, by the server, saving the instant messages in the session.

The process of ceasing, by the server, saving the instant messages in the session includes:

ceasing, by the server, saving instant messages in all sessions corresponding to the client which sends the cease saving instant message instruction.

During the process of sending a cease saving instant message instruction from the client to the server, the method further includes:

sending the session identifier of the instant messages to be ceased saving from the client to the server;

the process of ceasing, by the server, saving the instant messages in the session includes:

determining, by the server, a corresponding session in accordance with the session identifier sent from the client and ceasing saving the instant messages in the determined session.

After the process of saving, by the server, instant messages in a session in accordance with the session saving policy, the method further includes:

sending a session saving policy change instruction carrying a new session saving policy from the client to the server, and saving, by the server, instant messages in the session in accordance with the new session saving policy in response to the session saving policy change instruction.

The process of saving, by the server, instant messages in the session in accordance with the new session saving policy includes:

saving, by the server, instant messages in all sessions corresponding to the client which sends the session saving policy change instruction in accordance with the new session saving policy.

During the process of sending a session saving policy change instruction from the client to the server, the method further includes:

sending the session identifier of the session saving policy to be changed from the client to the server;

the saving, by the server, instant messages in the session in accordance with the new session saving policy includes:

determining, by the server, a corresponding session in accordance with the session identifier sent from the client and saving instant messages in the determined session in accordance with the new session saving policy.

After the process of saving, by the server, instant messages in a session in accordance with the session saving policy, the method further includes:

sending, by the server, a saving result of the instant messages to the client.

The process of sending the required session saving policy from a client to a server includes:

sending the required session saving policy from a client to a server before beginning an instant message session;

between the process of sending the required session saving policy from a client to a server and the process of saving, by the server, instant messages in a session in accordance with the session saving policy, the method further includes:

saving, by the server, the session saving policy sent from the client and a corresponding client identifier;

determining, by the server, whether the server has saved a session saving policy corresponding to the client which begins the instant message session in accordance with the client identifier of the instant message session when beginning the instant message session; if yes, saving, by the server, the instant messages in the session in accordance with the session saving policy; otherwise ending the current procedure.

A selection rule is preset in the server, and the process of sending the required session saving policy from a client to a server includes:

sending more than one session saving policy from a client to a server;

after the process of determining, by the server, that the server has saved a session saving policy corresponding to the client which begins the instant message session, the method further includes:

determining whether the client which begins the instant message session has designated one of the more than one session saving policy; if yes, saving instant messages in the session in accordance with the session saving policy; otherwise selecting in accordance with the selection rule one of the more than one session saving policy, corresponding to the client which begins the instant message session, saved in the server, and saving instant messages in the session in accordance with the session saving policy.

A client for saving instant messages, including a communication module adapted for sending messages, the client further includes:

an interface display module, adapted for providing the function of selecting a session saving policy and sending the selected session saving policy to a client message processing module; and the client message processing module, adapted for generating a corresponding saving request message in accordance with the session saving policy sent from the interface display module and sending the saving request message via the communication module.

The interface display module is further adapted for at least one of the following functions:

determining the session identifier of a session to be saved, and sending the determined session identifier to the client message processing module;

and determining the display name of a session to be saved, and sending the determined display name to the client message processing module;

the client message processing module is further adapted for making at least one of the following items sent from the interface display module be carried in the generated saving request message:

the identifier of the session to be saved and the display name of the session to be saved.

The interface display module is further adapted for providing a function of selecting a message type and sending the selected message type to the client message processing module;

the client message processing module is further adapted for generating a corresponding message in accordance with the message type sent from the interface display module and sending the generated message via the communication module.

A server for saving instant messages, including a message access module adapted for receiving a message, the received message in the message access module carrying a session saving policy, and the server further includes:

a server message processing module, adapted for obtaining the session saving policy from the received message and forwarding the session saving policy obtained to a management and control module;

the management and control module, adapted for making instant messages in a session be saved in a session storage module in accordance with the received session saving policy; and a storage module, adapted for saving the instant messages.

The received message further carries at least one of the following items:

a session identifier and a display name of session content;

the server message processing module is further adapted for obtaining the above items from the received message and forwarding the above items to the management and control module;

the management and control module is further adapted for providing at least one of the following functions:

determining a corresponding session in accordance with the session identifier and saving instant messages in the determined session in accordance with the session saving policy; and saving the session identifier when saving the instant messages in the session; and saving the display name of session content when saving the instant messages in the session.

The server message processing module is further adapted for determining whether the received message in the message access module is a cease request message, and sending a cease saving instruction to the management and control module if determining that the received message in the message access module is a cease request message;

the management and control module is further adapted for making the instant messages in the session be ceased saving in the session storage module on receiving the cease saving instruction.

The management and control module is further adapted for making at least one of the following items be saved in the storage module:

the session saving policy; and
the sender of the saved instant messages; and
the receiver of the saved instant messages; and
the sending time of the saved instant messages; and
the receiving time of the saved instant messages.

A system for saving instant messages includes a client and a server, the client is adapted for sending a required session saving policy to the server; and the server is adapted for saving instant messages in a session in accordance with the received session saving policy.

The client includes:

an interface display module, adapted for providing the function of selecting a session saving policy and sending the session saving policy selected to a client message processing module; and the client message processing module, adapted for generating a corresponding request message in accordance with the session saving policy sent from the interface display module and sending the request message via the communication module;

the communication module, adapted for sending the message generated by the client message processing module;

the server includes:

a message access module, adapted for receiving the saving request message sent from the client;

a server message processing module, adapted for obtaining the session saving policy from the received request message and forwarding the obtained session saving policy to a management and control module;

the management and control module, adapted for making instant messages in the session be saved in a session storage module in accordance with the received session saving policy; and a storage module, adapted for saving the instant messages.

The server is further adapted for returning a saving response message to the client;

the communication module of the client is further adapted for receiving the saving response message and sending the saving response message to the client message processing module;

the client message processing module is further adapted for displaying result information in the saving response message via the interface processing module;

the interface processing module is further adapted for displaying the saving result information of the instant messages.

The client is further adapted for sending a cease request message to the server;

the server is further adapted for ceasing saving the instant messages in the session on receiving the cease request message.

With the technical solution of the present invention, the server saves instant messages in accordance with the session saving policy set by the client. Therefore, on one hand, the server can save the content of the instant message session in accordance with different saving policies with no need of saving all contents of the instant message session, so that it can be avoided that a plenty of redundant information is saved in the server and the storage resource of the server can be saved; on the other hand, since the content of the instant message session is saved in accordance with the saving policy of the user, the interaction between the user and the server is relatively simple in the subsequent implementation of the functions of reading, deleting and sending the session content, so that the processing resource of the server is saved greatly.

DETAILED DESCRIPTION OF THE INVENTION

The core of the present invention lies in that a server saves instant messages in accordance with session saving policy/policies set by client.

The present invention is further described in detail with reference to the accompanying drawings to make the objects, technical solutions and advantages of the present invention clearer.

For the implementation of the present invention, a client shall determine a session saving policy before sending a saving request message to a server. Here, the session saving policy may be designed to: save the session record within a recent time period, e.g. save the session content within five minutes prior to the current time or save the session content within five minutes after the current time; or save several recent instant messages, e.g. save fifty instant messages before the current instant message or save forty instant messages after the current instant message; or save the session content within a time period or within several time periods, e.g. save the session content within the time period of 9:00-9:05 or save the session content within two time periods of 9:00-9:05 and 9:20-9:25; or save the session content between one and a specific contact, e.g. save the session content between one and user A.

The determination of the session saving policy includes indicating the session saving policy by an index number. As an example, three most-significant bits of a byte may be used to indicate the type of the session saving policy, and five least-significant bits of the byte may be used to indicate additional parameters related to the type of the session saving policy. For example, the three most-significant bits, 001, indicates saving the session content within a recent time period, and the five least-significant bits indicates the number of seconds of the time period correspondingly; the three most-significant bits, 010, indicates saving several recent instant messages, and the five least-significant bits indicates the number of the instant messages to be saved correspondingly.

Figure 1:
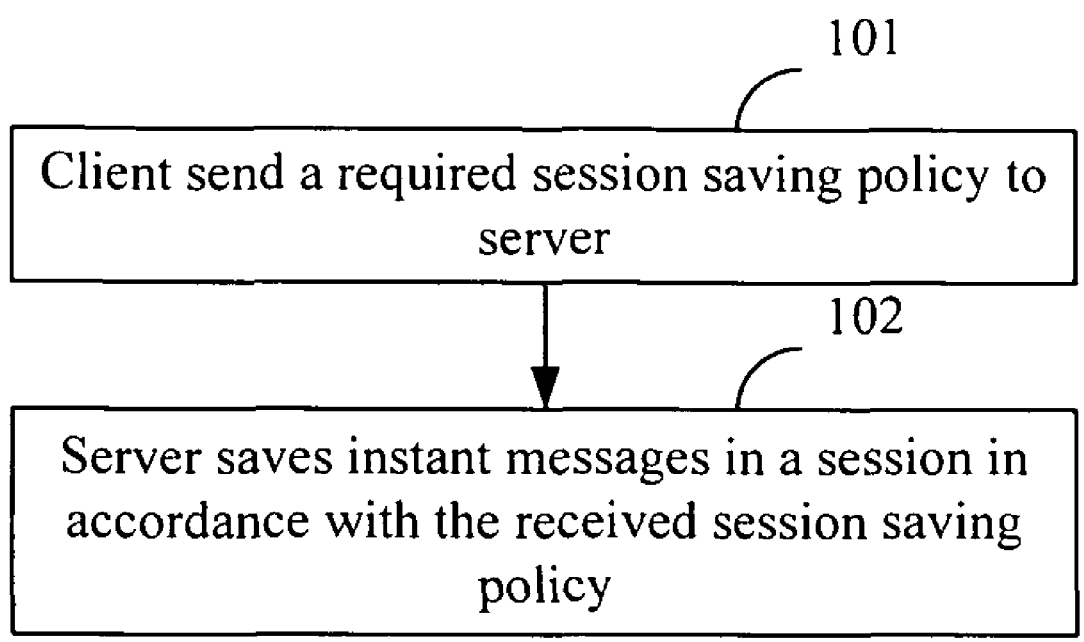
FIG. 1 is a flow chart of a method for saving instant messages according to the present invention.

FIG. 1 is a flow chart of a method for saving instant messages according to the present invention.

Process 101. a session saving policy is determined if a content of a session is to be saved as required, and the session saving policy is sent from a client to a server.

The process of sending the session saving policy from the client to the server refers to sending a saving request message carrying a determined index number to the server. The saving request message also carries the client identifier. If the client sends only the session saving policy to the server, the server saves contents of all sessions corresponding to the client in accordance with the session saving policy.

Indeed, it is possible that this processing method is unable to meet the user's requirements. The user may desire to set session saving policies for different sessions in the server respectively. Therefore, in the process 101 of the solution of the present invention, session identifiers together with the session saving policies are further sent to the server. The session identifiers are allocated by the server for the respective sessions. One session identifier corresponds to one session. On receiving a session identifier, the server can determine a session in accordance with the session identifier.

To make the user select a session saving policy, the session saving policy determined is displayed at the client, e.g. the session saving policy is displayed through a menu. If such values as time and the number of instant messages, a selection/adjustment interface may be further provided, so that the user can implement flexible configuration and adjustment. Apparently, the more the kinds of session saving policies are, the more the saving policies which can be selected by the user are.

In this process, the client may further send the display name of the session content to the server. The display name of the session content may be a name customized by the user. For example, the display name of the session content is set as: An appointment for the date with my friend.

Such information as the session identifier, the session saving policy and the display name may be sent from the client to the server, at the lower protocol layer, through SIP MESSAGE, or through MSRP as a bearing channel of the messages after a SIP/SDP session negotiation, or through other SIP messages such as SIP REFER.

Process 102. on receiving the session saving policy, the server saves the desired content in the session in accordance with the session saving policy.

If the client provides only the session saving policy to the server, the server applies the session saving policy to all sessions related to the terminal. If the client further sends the session identifier the server, the server may further determine a corresponding session in accordance with the session identifier, and applies the session saving policy to the session.

To ensure that the session content saved may be used conveniently in the subsequent functions of reading, deleting and sending, besides the specific content of the instant messages, the server when saving the session content may usually save some information related to the session content, e.g. session identifier, sender/receiver of each instant message, sending time/receiving time of each instant message, and display name sent from the user via the client. The more the information related to the session content is saved, the larger the storage space occupied in the server is. However, the user can get more information when invoking the session content thereafter.

Through the above processes, the session content can be saved on the user's demands.

The server may further return a saving response message to the client after saving the session content. The saving response message carries a saving result, such as whether the saving of the session content is successful. Dependent on the lower bearing protocol through which the client sends the saving request message, the saving response message returned from the server to the client may be a SIP 200 OK message, or an MSRP 200 OK message (in this case, MSRP is used as the bearer channel of the message).

Further, a cease request message is set. When the server saves the desired content in the session in accordance with the session saving policy, the client may send a cease request message to the server, to instruct the server to cease saving the session content. The cease request message may further carry the session identifier. The server ceases saving the session content in accordance with the session identifier on receiving the cease request message. If the cease request message does not carry the session identifier, the server ceases saving the content of all sessions corresponding to the client in accordance with the client identifier carried in the message on receiving the cease request message.

A change request message may be further set. When the server saves the desired content in the session in accordance with the session saving policy, the client may send a change request message to the server, to instruct the server to change the session saving policy for saving the session content. The client may send a change request message to the server to instruct the server to change the display name of the session content to be saved. The change request message may be in a format similar to that of the saving request message, i.e. the change request message carries at least one of the changed session saving policy and the changed display name of the session, and may further carry the session identifier.

As a first alternative solution, a default session saving policy may be set in the client. For example, the default session saving policy is set to save the session content within recent three minutes, or the default session saving policy is set to save the session content between the client and the user A. In this case, once the client begins a session through an instant message, the client sends the default session saving policy to the server. Alternatively, the client may send the default session saving policy together with the session identifier to the server.

As a second alternative solution, the client, before beginning an instant message session, may send a session saving policy to the server so that the server can store the session saving policy. Then, when the client starts the instant message session, the server first determines whether it has stored a session saving policy for the client. If yes, the server saves the session content in the session in accordance with the stored session saving policy; otherwise the server does not perform a saving operation.

If the server saves the session content in accordance with a session saving policy stored in it, the client may determine multiple session saving policies and send these session saving policies to the server. In this case, the server shall determine whether the client has selected one of these session saving policies as the current session saving policy before saving the session content in accordance with the session saving policy. If yes, the server saves the session content in the session in accordance with the session saving policy selected by the client; otherwise the server selects one from its stored session saving policies as the current session saving policy in a random manner or selects one from its stored session saving policies as the current session saving policy in accordance with a predetermined rule, e.g. a rotation rule, and saves the session content in accordance with the selected session saving policy.

Figure 2:
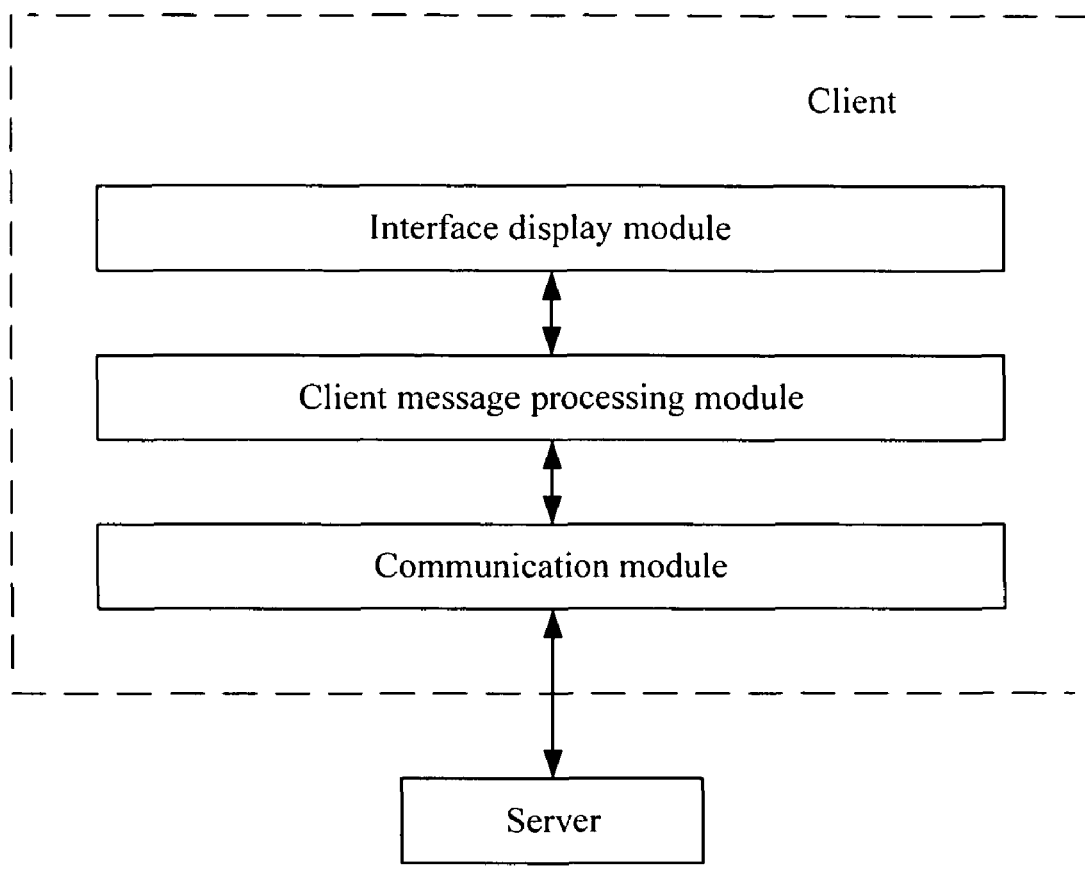
FIG. 2 is an architectural diagram of a client in a system for saving instant messages according to the present invention.
Figure 3:
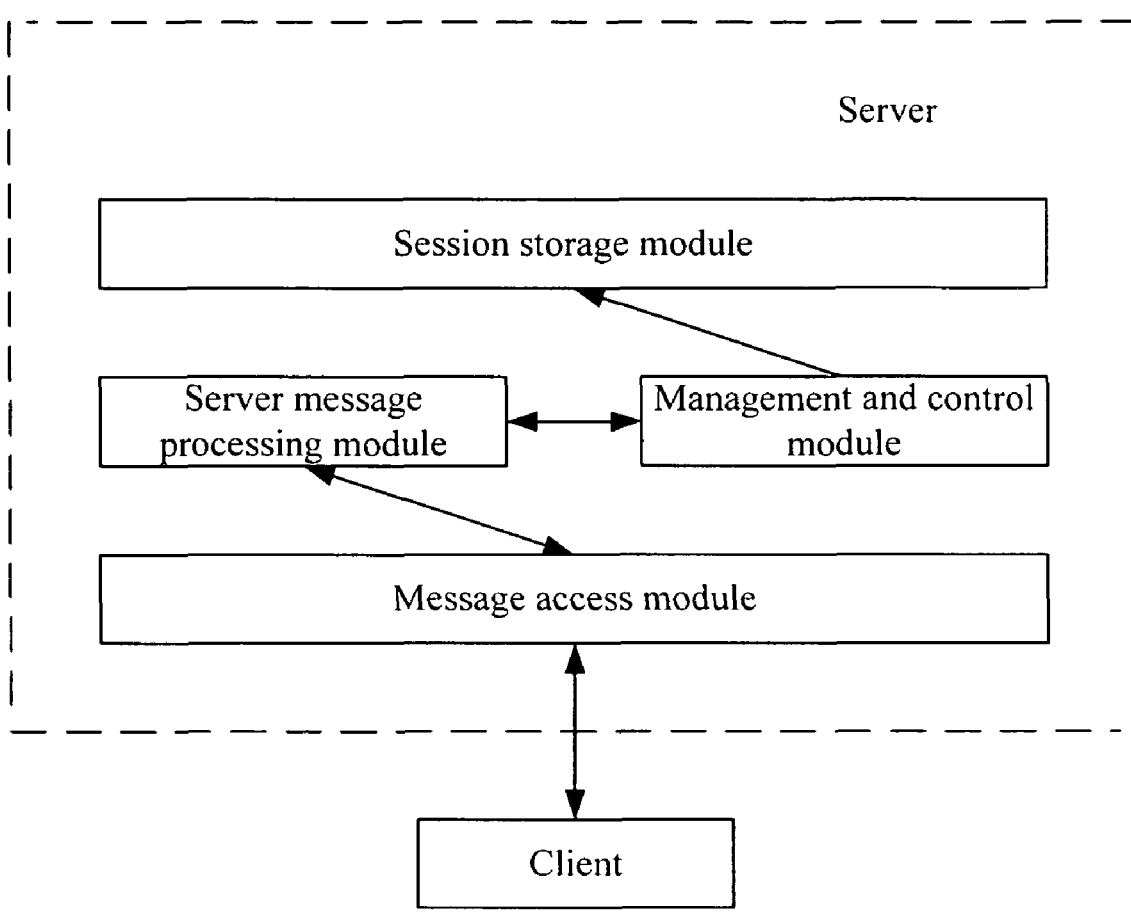
FIG. 3 is an architectural diagram of a server in a server for saving instant messages according to the present invention.

In the present invention, corresponding functions shall be added in the client and the server, to implement the above method for saving instant messages, i.e. the client should be able to send the session saving policy to the server; and the server should save the session content in the session in accordance with the session saving policy. The client may further send the session identifier to the server, and the server further determines a corresponding session in accordance with the session identifier. The client may be specifically as illustrated in FIG. 2. The server may be as illustrated in FIG. 3.

The client in the present invention, as illustrated in FIG. 2, includes at least an interface display module, a client message processing module, and a communication module.

Specifically, the interface display module is an existing module in the client. The interface display module provides such information as the display name of a session, session content, and the name of the session party. Besides, it further provides as required in the present invention the function of selecting a session saving policy, the further function of selecting/adjusting additional parameters in terms of some session saving policies, and sends the selected session saving policy and the additional parameters to the client message processing module. The determination of the additional parameters may be deemed as a part of the determination of the session saving policy.

If the client sends a session saving policy to the server when session content saving is required by the client, the interface display module may further provide the function of selecting/inputting the session identifier, and send the selected session identifier to the client message processing module.

The interface display module may further provide the function of inputting the display name of the session content, and send the input display name to the client message processing module.

If a cease request message and/or a change request message are/is set, the interface display module may further provide a function of selecting the message type, and send the message type selected to the client message processing module.

The client message processing module is an existing module in the client. The client message processing module mainly processes all messages, e.g. constructs and instructs the communication module to send the saving request message(s), the cease request message(s) or the change request message(s); receives and processes the saving response message(s); sends message display message(s) and user notification message(s) to the interface display module as per service requirements. In the present invention, the client message processing module is further adapted to generate a saving request message in accordance with the session saving policy sent from the interface display module, and send the saving request message to the server via the communication module. If the information sent from the interface display module further includes a session identifier, the client message processing module further generates a saving request message in accordance with the session identifier and the session saving policy. If the interface display module further sends other information such as display name, the client message processing module further sends the saving request message carrying the display name to the server. If the cease request message and/or the change request message are/is set, the client message processing module further determines a message to be sent in accordance with the type of the message sent from the interface display module.

If the server returns a response message, the communication module in the client sends the response message received to the client message processing module. The client message processing module determines whether the saving is successful in accordance with the response message, and sends the information indicating "successful" or "unsuccessful" to the interface display module to be displayed.

The server in the present invention, as illustrated in FIG. 3, includes a message access module, a server message processing module, a session storage module, and a management and control module.

Specifically, the message access module is an existing module and adapted to exchange messages with the client via a network, e.g. receive request and response messages sent from a client, and initiate messages to the client. In the present invention, the message access module is further adapted to receive the session saving policy/policies sent from the client, specifically the saving request message(s) sent from the communication module of the client, and send the message(s) to the server message processing module.

The server message processing module is also an existing module and adapted to process all messages received by the server (specifically, to process requests from the message access module), return response messages as required, and send request messages to the management and control module of the server as per service requirements, etc. In the present invention, the server message processing module is further adapted to process the saving request message, and send the session saving policy in the saving request message to the management and control module. If the saving request message further includes other information such as a session identifier and a display name, the server message processing module may alternatively send the information together with the saving request message to the management and control module. The server message processing module may further receive saving result information returned from the management and control module, such as saving success or failure information, and send the saving result information to the client via the message access module.

If a change request message is set, the server message processing module is further adapted to process the change request message in a manner similar to the manner of processing the saving request message.

If a cease request message is set, the server message processing module is further adapted to send a cease saving instruction to the management and control module. If the cease request message further includes a session identifier, the server message processing module may alternatively send the session identifier together with the cease saving instruction to the management and control module.

The management and control module is also an existing module and adapted to manage and control instant messages, e.g. send and receive instant messages, and instruct the server message processing module to forward user messages. In the present invention, the management and control module is further adapted to make session content be saved in a session storage module in accordance with the received session saving policy. The management and control module is further adapted to enable the storage of the session saving policy, and may return the saving success or failure information to the server message processing module. If further receiving a session identifier, the management and control module may determine a session in accordance with the session identifier, and be adapted to enable the saving of the session content in accordance with the session saving policy. If further receiving a display name, the management and control module shall save the display name at the same time when saving the session content. The management and control module may be further adapted to enable the saving of the information related to the session content, such as the session identifier, the sender/receiver, and the sending time/receiving time.

If a cease request message is set, the management and control module, if receiving the session identifier when receiving the cease saving instruction sent from the server message processing module, ceases the saving of the session content determined by the session identifier; if receiving no session identifier, the management and control module ceases the saving of the content of all sessions corresponding to the client which sends the cease request message.

The above description is merely for preferred embodiments of solution of the present invention, and does not limit the scope of the present invention.

What is claimed is:

1. A method for saving instant messages, comprising:
    receiving, by a server, at least two session saving policies which are determined by a terminal from the terminal before beginning an instant message session;
    saving, by the server, the session saving policies sent from the terminal and a corresponding client identifier;
    determining, by the server, that the server has saved the session saving policies corresponding to the terminal which begins the instant message session in accordance with the client identifier when beginning the instant message session, and determining whether the terminal which begins the instant message session has designated one of the at least two session saving policies;
    if the server has saved the session saving policies corresponding to the terminal which begins the instant message session and the terminal has designated one of the at least two session saving policies, saving, by the server, instant messages in the instant message session in accordance with the designated session saving policy;
    otherwise, selecting, by the server, in accordance with a selection rule one of the at least two session saving policies which correspond to the terminal which begins the instant message session and which are saved in the server, and saving the instant messages in the instant message session in accordance with the selected session saving policy;
    wherein the selection rule for selecting one of the at least two session saving policies is preset in the server.

2. The method according to claim 1, wherein the session saving policies comprise: saving instant messages within a recent time period, or saving at least one recent instant message, or saving instant messages within one time period or within several time periods, or saving instant messages between one and a specific contact.

3. The method according to claim 2, wherein:
    the recent time period comprises: a time period up to a current time instant, or a time period starting from a current time instant; and
    the at least one recent instant message comprises: at least one instant message up to a current instant message, or at least one instant message starting from a current instant message.

4. The method according to claim 1, further comprising:
    indicating the session saving policy by an index number;
    wherein the process of receiving the at least two session saving policies comprises: receiving the index number of the session saving policy; and
    the process of saving, by the server, the instant messages in the instant message session in accordance with the session saving policy comprises: determining, by the server, the session saving policy in accordance with the index number and saving the instant messages in the session in accordance with the session saving policy.

5. The method according to claim 1, further comprising: saving the session identifier of the session.

6. The method according to claim 1, further comprising:
    saving, by the server, at least one of the following information corresponding to each of the saved instant messages when saving the instant messages: the sender of the instant messages, the receiver of the instant messages, the sending time of the instant messages, and the receiving time of the instant messages.

7. The method according to claim 1, further comprising:
    receiving a display name of a session to be saved from the terminal to the server; and
    saving, by the server, the display name of the session when saving the instant messages.

8. The method according to claim 7, further comprising:
    receiving a display name change instruction carrying a new display name and a session identifier corresponding to a display name to be changed; and
    determining, by the server, a session in accordance with the session identifier, and saving, by the server, the new display name when saving the instant messages in the determined session.

9. The method according to claim 1, further comprising:
    receiving a cease saving instant message instruction from the terminal; and ceasing, by the server, saving the instant messages in the session.

10. The method according to claim 9, wherein the process of ceasing, by the server, saving the instant messages in the session comprises:
ceasing, by the server, saving instant messages in all sessions corresponding to the terminal which sends the cease saving instant message instruction.

11. The method according to claim 9, further comprising:
receiving the session identifier of the instant messages to be ceased saving from the terminal;
wherein the process of ceasing, by the server, saving the instant messages in the session comprises: determining, by the server, a session in accordance with the session identifier sent from the terminal and ceasing saving the instant messages in the determined session.

12. The method according to claim 1, further comprising:
receiving a session saving policy change instruction carrying a new session saving policy from the terminal, and
saving, by the server, instant messages in the session in accordance with the new session saving policy in response to the session saving policy change instruction.

13. The method according to claim 12, wherein the process of saving, by the server, instant messages in the session in accordance with the new session saving policy comprises:
saving, by the server, instant messages in all sessions corresponding to the terminal which sends the session saving policy change instruction in accordance with the new session saving policy.

14. The method according to claim 12, further comprising:
sending the session identifier of the session for which the session saving policy is to be changed to the server;
wherein the saving, by the server, instant messages in the session in accordance with the new session saving policy comprises: determining, by the server, a session in accordance with the session identifier sent from the terminal and saving instant messages in the determined session in accordance with the new session saving policy.

15. The method according to claim 1, wherein the process of saving, by the server, instant messages in a session in accordance with the session saving policy comprises:
saving, by the server, instant messages of all sessions corresponding to the terminal which sends the session saving policy, in accordance with the designated session saving policy or the selected session saving policy.

16. The method according to claim 1, further comprising:
sending a session identifier of an instant message session to be saved to the server;
wherein the saving, by the server, the instant messages in the instant message session comprises: determining an instant message session in accordance with the session identifier sent from the terminal and saving instant messages in the determined instant message session in accordance with the designated session saving policy or the selected session saving policy, by the server.

17. A system for saving instant messages, comprising:
a terminal comprising:
a client message processing module;
a communication module adapted for sending a session saving policy to a server before beginning an instant message session; and
an interface display module, adapted for selecting a session saving policy and sending the selected session saving policy to the client message processing module, and for determining a session identifier of a session to be saved and sending the determined session identifier to the server;
wherein the client message processing module is adapted for generating a saving request message in accordance with the session saving policy sent from the interface display module and for sending the saving request message via the communication module; and
wherein the communication module is adapted for sending the saving request message generated by the client message processing module; and
a server comprising:
a management and control module;
a session storage module;
a message access module, adapted for receiving the saving request message sent from the terminal; and
a server message processing module, adapted for obtaining the session saving policy from the received saving request message and for forwarding the obtained session saving policy to the management and control module;
wherein the management and control module is adapted for determining a session in accordance with the session identifier sent from the terminal and making the instant messages in the determined session saved in a session storage module in accordance with the session saving policy; and
wherein the session storage module is adapted for saving the instant messages in the session in accordance with the session saving policy;
wherein the server is further adapted for:
saving the session saving policy sent from the terminal and a corresponding client identifier;
determining that the server has saved a session saving policy corresponding to the terminal which begins the instant message session in accordance with the client identifier when beginning the instant message session; and
saving the instant messages in the session in accordance with the session saving policy;
wherein the server is further adapted for:
presetting a selection rule in the server;
sending at least two session saving policies from the server; and
determining whether the terminal which begins the instant message session has designated one of the at least two session saving policies; if yes, saving instant messages in the session in accordance with the designated session saving policy; otherwise selecting in accordance with the selection rule one of the at least two session saving policies, which correspond to the terminal which begins the instant message session, and which are saved in the server, and saving instant messages in the session in accordance with the selected session saving policy.

18. The system according to claim 17, wherein:
the server is further adapted for returning a saving response message to the terminal;
the communication module of the terminal is further adapted for receiving the saving response message and sending the saving response message to the client message processing module;
the client message processing module is further adapted for displaying saving result information in the saving response message via the interface display module; and the interface display module is further adapted for displaying the saving result information.

19. The system according to claim 17, wherein:
the terminal is further adapted for sending a cease request message to the server; and
the server is further adapted for ceasing saving the instant messages in the session on receiving the cease request message.

20. A method for saving instant messages, comprising:
receiving, by a server from a terminal, at least two session saving policies which are determined by the terminal;
presetting, by the server, a selection rule for selecting one of the at least two session saving policies;
saving, by the server, the session saving policies sent from the terminal and a corresponding client identifier;
determining, by the server, whether the server has saved the session saving policies corresponding to the terminal which begins an instant message session in accordance with the client identifier when beginning the instant message session, and whether the terminal which begins the instant message session has designated one of the at least two session saving policies;
if the server has saved the session saving policies corresponding to the terminal which begins an instant message session and the terminal has designated one of the at least two session saving policies, saving, by the server, instant messages in the instant message session in accordance with the designated session saving policy;
otherwise, selecting, by the server, in accordance with the selection rule one of the at least two session saving policies which correspond to the terminal which begins the instant message session and which are saved in the server, and saving the instant messages in the instant message session in accordance with the selected session saving policy.

21. The method according to claim 20, further comprising:
sending a session identifier of an instant message session to be saved to the server; and
wherein saving, by the server, the instant messages in the instant message session comprises: determining an instant message session in accordance with the session identifier sent from the terminal and saving instant messages in the determined instant message session in accordance with the designated session saving policy or the selected session saving policy by the server.

22. A server for saving instant messages, configured to:
receive from a terminal at least two session saving policies which are determined by the terminal;
preset a selection rule for selecting one of the at least two session saving policies;
save the session saving policies sent from the terminal and a corresponding client identifier;
determine whether the server has saved the session saving policies corresponding to the terminal which begins an instant message session in accordance with the client identifier when beginning the instant message session, and whether the terminal which begins the instant message session has designated one of the at least two session saving policies;
if the server has saved the session saving policies corresponding to the terminal which begins an instant message session and the terminal has designated one of the at least two session saving policies, save instant messages in the instant message session in accordance with the designated session saving policy;
otherwise, select in accordance with the selection rule one of the at least two session saving policies which correspond to the terminal which begins the instant message session and which are saved in the server, and save the instant messages in the instant message session in accordance with the selected session saving policy.

23. The server according to claim 22, wherein the server is further configured to send a session identifier of an instant message session to be saved to the server, determine an instant message session in accordance with the session identifier sent from the terminal, and save instant messages in the determined instant message session in accordance with the designated session saving policy or the selected session saving policy by the server.

* * * * *